United States Patent [19]

Shafer

[11] Patent Number: 4,464,015

[45] Date of Patent: Aug. 7, 1984

[54] BINOCULAR STEREOSCOPIC VIEWERS

[75] Inventor: David R. Shafer, Fairfield, Conn.

[73] Assignee: Center Art Galleries, Honolulu, Hi.

[21] Appl. No.: 295,569

[22] Filed: Aug. 24, 1981

[51] Int. Cl.³ .................... G02B 27/24; G02B 7/18
[52] U.S. Cl. .................................. 350/138; 350/287
[58] Field of Search ............... 350/138, 137, 143, 145, 350/146, 286, 287

[56] References Cited

U.S. PATENT DOCUMENTS

| 2,410,757 | 11/1946 | Street | 350/286 |
| 3,274,884 | 9/1966 | Sortor | 350/138 |
| 3,539,939 | 11/1970 | Courtney-Pratt | 350/286 |
| 3,655,264 | 4/1972 | Pickett | 350/287 |
| 4,353,621 | 10/1982 | Geer et al. | 350/287 |

FOREIGN PATENT DOCUMENTS

| 2106596 | 10/1972 | Fed. Rep. of Germany | 350/138 |
| 23163 | of 1911 | United Kingdom | 350/137 |
| 118316 | 9/1957 | U.S.S.R. | 350/138 |

Primary Examiner—Jon W. Henry
Attorney, Agent, or Firm—F. Eugene Davis IV

[57] ABSTRACT

Binocular stereoscopic viewers for viewing large drawings, paintings and prints, particularly those having dimensions larger than the interpupillary distance utilize two sets of nearly parallel mirrors and deviate the apparent position of the eyes inward towards the nose. Another viewer comprises a pair of prisms oriented such that the images viewed are reflected off their bases by total internal reflection. In the preferred prism viewer the apices of the prisms are hinged together in front of the nose of the viewer and the viewer may be stored with two sides together to form a prism shaped structure. In the preferred structures of both the mirror and the prism viewers, the left eye views the stereogram on the right and the right eye views the stereogram on the left and the surfaces of the device presented to the viewer are concave over the viewer's nose.

8 Claims, 14 Drawing Figures

BINOCULAR STEREOSCOPIC VIEWERS

TECHNICAL FIELD

This application relates to binocular stereoscopic viewers. More particularly it relates to such viewers for viewing large stereo pairs, particularly paintings, drawings, and prints.

The viewers are capable of adjustment for viewing stereo pairs mounted on a wall from different distances and are compact, convenient and comfortable to use. Furthermore, the preferred hinged prism viewer, when stored, becomes an art object in itself.

BACKGROUND ART

The art of stereoscopic drawing was devised at least as early as around the year 1600 by the Italian artist Giovanni Battista della Porta. However, until the development of the Wheatstone stereoscope, such pictures could not be any larger than the interpupillary distance; that is a separation of the human eyes of approximately 6.5 centimeters. Various stereoscopic viewers, that is stereoscopes, have been developed since Wheatstone, but the primary object has always been to view stereo pairs mounted at a fixed or nearly fixed distance from the viewers eyes.

The Spanish Surrealist artist Salvador Dali has recently developed a new area of art: stereo paintings. Dali has produced several pairs of paintings that are apparently identical at first glance, but which are actually right and left-eyed stereo views of the subject of the painting. In addition to incorporating the normal stereo perspective differences between the two paintings that one must have for a true stereo pair, Dali has also added subtle variations in lighting and coloring to the two paintings. These are sometimes deliberately exaggerated or distorted so as to induce visual illusions that go beyond realism to the surreal.

In some cases, these stereo paintings are produced with the aid of photographs of models taken from different vantage points; in other cases, by means of extensive foreshortening and parallax calculations. In any event, Dali put an extraordinary amount of effort, attention to detail, and imagination into the creation of these stereo paintings. Clearly this effort deserves a viewing device that allows the viewer to experience stereo fusion without any significant optical degradation of the paintings.

One might approach this design problem in a variety of ways. What is desired are devices that are held up to the eyes in order to view the paintings from any distance, under normal illumination. A viewer should be capable of mass production (several thousand units) to be sold with a limited edition printing of lithographs made from one of Dali's stereo painting pairs.

FIGS. 1 and 2 show the basic problem. The paintings or lithographs are mounted side by side on a wall at eye level. The observer is several feet away and looks between the two paintings. The optics in front of each eye must deviate the line of sight so that the right eye sees only the right-eyed-view painting and the left eye sees only the left-eyed-view painting. To the observer, the two paintings will appear to occupy the same space, and stereo fusion will occur. FIG. 1 shows one way to deviate the lines of sight, and FIG. 2 shows an equally valid alternative.

The constraints affecting the design of the viewer are:

(A) highest possible optical quality;
(B) lowest possible cost;
(C) small size and weight;
(D) no development time—stock optics if at all possible;
(E) Aesthetic compatibility with artistic goals.

In addition, it is desirable to make the viewer adjustable so that the observer will not have to be at a fixed distance from the paintings. The constraint most emphasized is E above—aesthetics. The viewer is itself intended to be a work of art that will reflect certain artistic themes of Dali. Some viewer candidates were rejected solely because of aesthetic failings.

The first viewer considered was a pair of prismatic wedges, shown in FIG. 3. The lines of sight could be deviated in or out. For a reasonable viewing distance, the prism wedge angle must be at least 20°, with 30° more like the desired amount. The deviation is fixed in this viewer, so one must stand at a fixed distance from the paintings. Once fusion has been achieved, the brain is very forgiving of small changes in this distance. Still, an adjustable viewer is preferred.

DISCLOSURE OF THE INVENTION

FIG. 4 shows how this viewer can be made adjustable. In this version, one eye looks through a single prism, while the other eye looks through a counter-rotating pair. By changing the azimuth angle between the pair of wedges (better known as Risley prisms), a variable deviation is obtained. Both prisms must rotate in opposite directions by the same amount. Therefore, it is not mechanically as simple as one might want.

Although the wedge approach (with prisms deviating the lines of sight) works, it has several features that are not ideal. Closeup viewing distances require large wedge angles on the prisms. This in turn introduces a fair amount of dispersive color, which may be objectionable. A more important effect is that straight lines do not look straight, due to a variable anamorphic effect as one looks obliquely through different parts of the prism. Not only do straight lines bow, but this anamorphic effect can also make a square look like a trapezoid. These effects increase with prism wedge angle. Furthermore, the right and left eye views are not distorted in the same sense—a line may bow in for one eye and out for the other, making good stereo fusion difficult. These problems are reduced by using small prism wedge angles, but then one must stand too far away from the art work to achieve a desirable visual field of view. The effect of the stereo difference between the painting pairs is obviously the strongest when one can view them from close up.

Another version of the prism approach is the use of Fresnel wedges, shown in FIG. 5. They are much lighter than prisms, and can be replicated or molded in large quantities at low cost. Unfortunately, there are problems with both the high and low density Fresnel rulings. The fine rulings scatter an objectionable amount of light into the line of sight, especially if there is a lamp or some other bright light near the stereo paintings. A forebaffle can reduce this effect, but adds greatly to the depth of the viewer dimensions. The coarse rulings do not have this problem, but cause a noticeable "dicing" of the view as the line of sight crosses the ruling boundaries. Fresnel wedges, then, causes a considerable degradation in the optical quality, and were rejected as unsuitable.

One aspect of viewer design that must always be considered is the problem of baffling. Ideally, each eye would see only one of the paintings and not both. Baffles can control this problem but they tend to take up a lot of space.

The all-reflective viewer, first developed by Wheatstone, has no color effects or geometrical distortions, and gives much better picture quality than the deviating wedge approaches.

Two forms of the forward looking Wheatstone viewer are shown in FIGS. 6 and 7. In the prior art viewer shown in FIG. 6 the lines of sight are bent outwardly so that the left eye views the left stereogram and the right eye views the right stereogram. But, as shown in FIG. 7 the lines of sight may be bent inwardly so that the left eye views the righthand stereogram and the right eye views the lefthand stereogram. It turns out that the mirrors may then be placed close together so that they are self-baffling. The viewers of FIGS. 6 and 7 have the disadvantage that the edges 22 and 24 of the inner mirrors may engage the nose of the viewer near the eyes.

This latter defect may be overcome by deviating the line of sight inwardly towards mirrors disposed concave across the nose as shown in FIGS. 8 and 9. The lines of sight may be crossed as shown in FIG. 8 or uncrossed as shown in FIG. 9. The viewers of FIGS. 8 and 9 must be baffled so that the eyes cannot look directly between the mirrors without reflection. I have found that this baffling may be accomplished by placement of the mirros only, if the crossed line of sight version of FIG. 8 is employed as shown in FIG. 10. Furthermore, one of the mirrors 26 is tiltable about a hinge 27 to provide for changing the relative angle of the lines of sight between the left and the right eye for viewing the stereo pairs at various distances.

The viewer of FIG. 10 is quite acceptable, being comfortable to wear, adjustable for different viewing distances, and is fairly light and compact. However, I have discovered a viewer which meets the various criteria, including artistic compatibility, in a much better way.

Referring to FIGS. 11 and 12, this viewer comprises two prisms in which the line of sight is deviated by total internal reflection off of the base. It is preferred that the two prisms be oriented as shown in FIG. 11 so that the edges 28 and 30 as shown in FIG. 12 do not point towards the nose of the viewer near the eyes.

As shown in FIG. 13, the preferred prism viewer may be provided with a hinge 32 for adjustment for differing viewing distances and so that it may be compactly folded up into the artistically pleasing shape shown in FIG. 14.

OBJECTS OF THE INVENTION

It is therefore an object of the invention to provide a binocular stereoscopic viewer for paintings, drawings and prints.

Another object of the invention is to provide such a viewer of the highest possible optical quality.

A further object of the invention is to provide such a viewer at the lowest possible cost.

A further object of the invention is to provide such a viewer of small size and weight.

Still another object of the invention is to provide such a viewer utilizing stock optical components.

Yet still another object of the invention is to provide such a viewer which is aesthetically compatible with the art works being viewed.

A further object of the invention is to provide such a viewer for viewing art works mounted on a wall at varying distances.

Another object of the invention is to provide such a viewer which is comfortable for the user.

Still another object of the invention is to provide such a viewer for viewing stereograms larger than the interpupillary distance.

Other objects of the invention will in part be obvious and will in part appear hereinafter.

The invention accordingly comprises the features of construction and elements, arrangements of parts and articles of manufacture possessing the features, properties and the relationship of elements which will be exemplified in the constructions and articles hereinafter described. The scope of the invention is indicated in the claims.

BRIEF DESCRIPTION OF THE DRAWINGS

For a fuller understanding of the nature and objects of the invention reference should be had to the following detailed description taken in connection with the accompanying drawings in which.

The same reference characters refer to the same elements throughout the several views of the drawings.

BEST MODE FOR CARRYING OUT THE INVENTION

Figure 10:
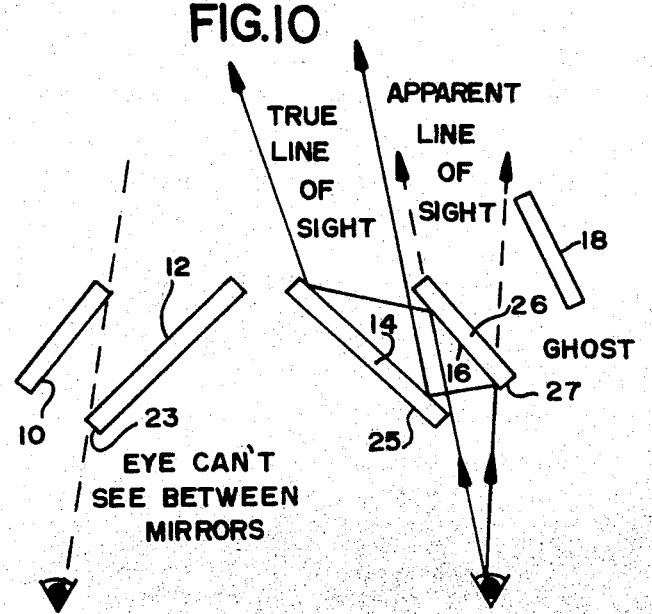
FIG. 10 is a more explanatory diagram of the viewer illustrated in FIG. 8.

Now referring to FIG. 10, in the preferred form of binocular stereoscopic viewer employing mirrors, the mirrors 10, 12, 14 and 16, are placed as shown such that their mirror surfaces face each other.

It is quite distracting if one can look between the inner and outer mirrors 12, 10 and 14 and 16, and get a direct view of the paintings. This sneak path can be completely baffled by placement of the mirrors close together as shown in FIG. 10 when the line of sight is deviated inwardly so that the left eye views the right painting and the right eye views the left painting. Furthermore, the viewer may be made adjustable for viewing at varying distances from the paintings by hinging one of the mirrors, e.g. mirror 16, at hinge 27.

Figure 1:
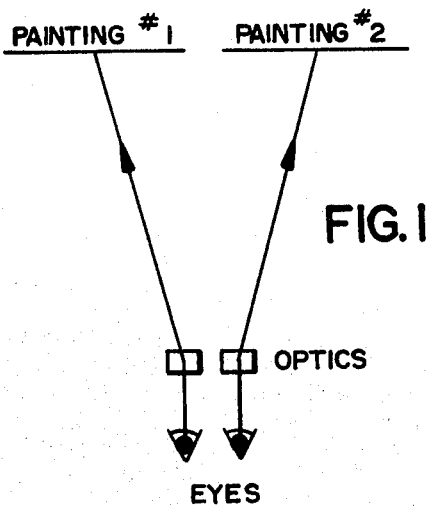
FIG. 1 is a diagrammatic view showing one way in which stereograms may be viewed.
Figure 2:
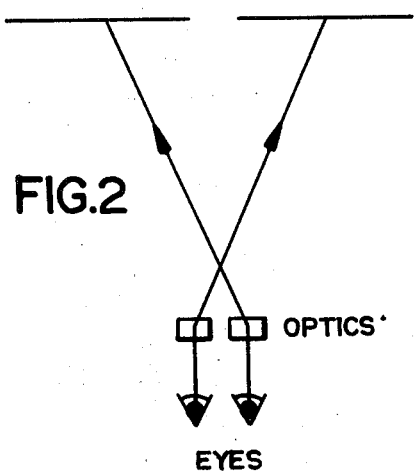
FIG. 2 is a diagrammatic view showing an alternative way in which stereograms may be viewed.
Figure 3:
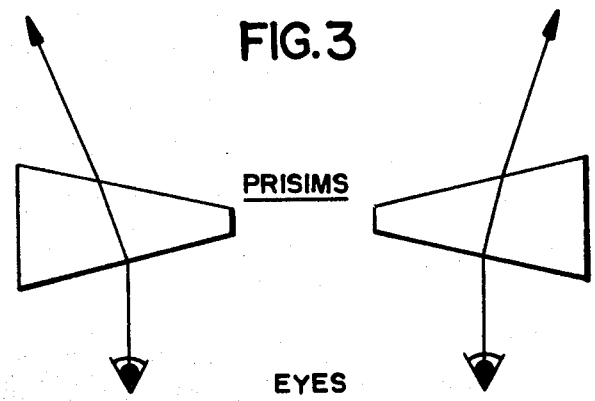
FIG. 3 is a diagram of a prior art stereo viewer.
Figure 4:
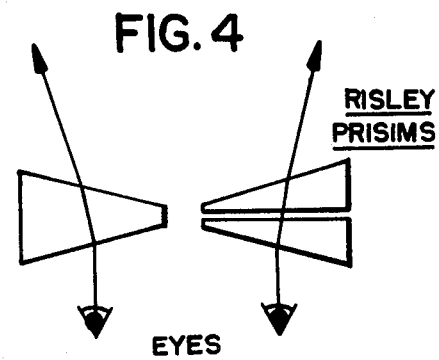
FIG. 4 is a diagram of a way in which the viewer of FIG. 3 may be made adjustable for differing viewing distances according to my invention.
Figure 5:
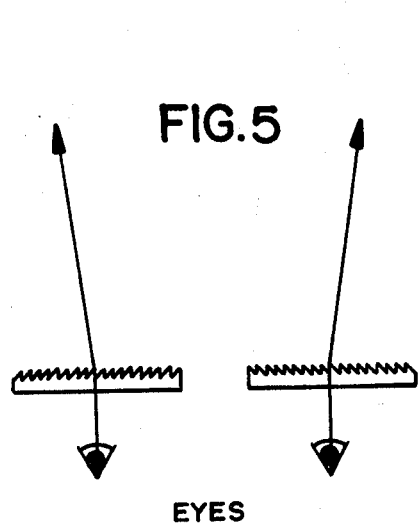
FIG. 5 is a diagram of an alternative stereo viewer according to my invention.
Figure 6:
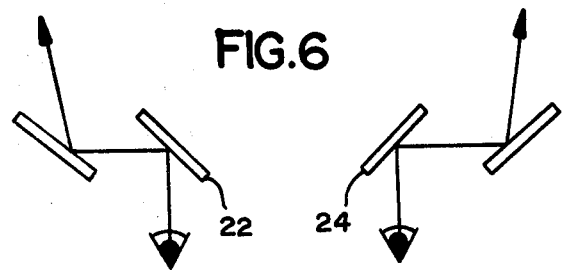
FIG. 6 is a diagram of a prior art stereo viewer.
Figure 7:
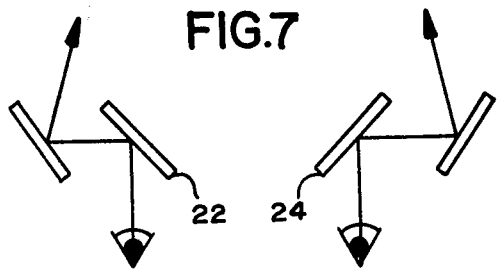
FIG. 7 is a diagram of an alternative stereo viewer according to my invention.
Figure 8:
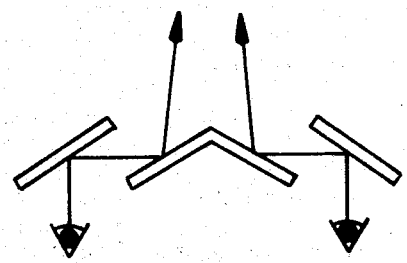
FIG. 8 is a diagram of a preferred form of binocular stereo viewer according to my invention utilizing mirrors.
Figure 9:
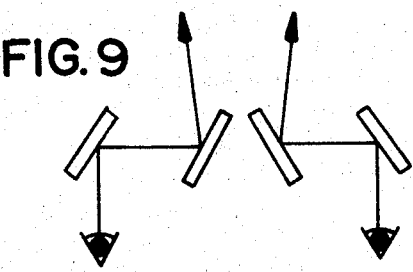
FIG. 9 is an alternative embodiment of the viewer of FIG. 8.

An equally important aspect that must be dealt with is the ghost image of the outer mirrors that is formed by a double reflection between the inner and outer mirrors. This ghost is quite noticeable and can often be seen in a view of any bright light in the room. Again, by careful placement of the mirrors as shown in FIG. 10, the apparent line of sight can be adjusted such that it does intercept the ghost image 18 and therefore the ghost image 18 is not seen. Again this baffling task is more easily accomplished when the true lines of sight of the two eyes cross than when they diverge. Although the version of FIG. 7 works equally as well, the viewer shown in FIG. 10 is the preferred form of an all mirror viewer since the edges 23 and 25 of mirrors 12 and 14 do not point inwardly toward the nose of the user.

The optical quality of the mirror viewer is essentially perfect. In addition, it uses stock optics, has a size about that of a thick pair of glasses, and costs a reasonable amount. There is, however, a different type of viewer which has equally desirable features but which is simpler and less expensive to assemble. It is adjustable, can be used at closer viewer distances than the mirror designs, is very easy to baffle, and has certain aesthetic advantages over the mirror systems.

Figure 11:
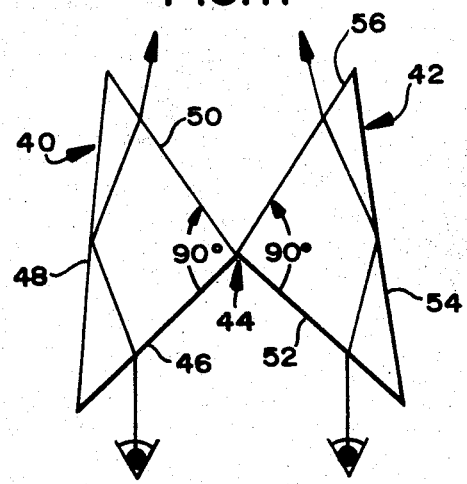
FIG. 11 is a diagram of a preferred form of binocular stereoscopic viewer according to my invention.
Figure 12:
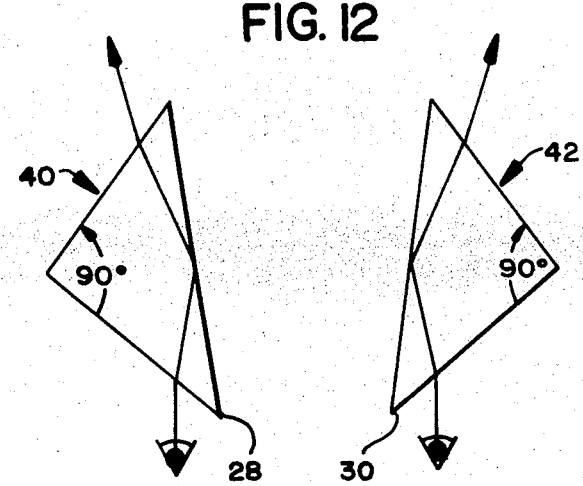
FIG. 12 is a diagram of an alternative form of the viewer shown in FIG. 11.

This other viewer system is shown in two variations in FIGS. 11 and 12. (There are actually two more variations along the lines of FIGS. 6, 7, 8 and 9, but they provide less of a field of view.)

Now referring to FIG. 11, the preferred viewer comprises two prisms generally indicated at 40 and 42 with their apices together as shown at 44. I have shown the apex angle to be 90° as such prisms are readily available as war surplus, seconds and the like. However, other angles may be employed. The field of view from the left eye passes through face 46, is totally internally reflected off base 48 and passes through face 50. Similarly, the right field of view passes through face 52, is totally internally reflected off base 54 and passes through face 56. It will readily be seen that by rotating the prisms, the angle between the fields of view from the left and right eye may be varied from crossing over as shown to actually diverging. However, the crossing over version is preferred where the left eye views the right stereogram and the right eye views the left stereogram as the large angle between the faces 46 and 52 makes the viewer more comfortable to the person using it. The alternative version shown in FIG. 12 is less comfortable to wear because of the edges 28 and 30 point inward towards the nose at the eyes of the person using the viewer. Furthermore, structure must be added to hold the two prisms and to provide for the rotation of one with respect to the other so that the viewing distance may be varied.

Figure 13:
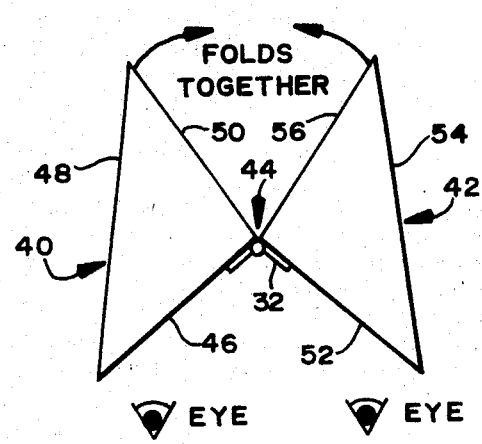
FIGS. 13 and 14 are diagrams of the preferred form of viewer shown in FIG. 11, showing how it may be hinged and compactly folded into an artistic form.
Figure 14:
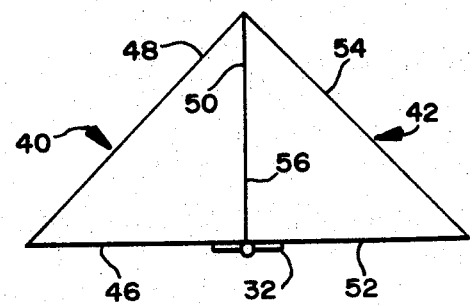

As shown in FIG. 13, the prism viewer according to FIG. 11 may be hinged by means of a plastic hinge 32 cemented along the apices 44 between the prisms 40 and 42. This provides for easily adjusting the angle of view for different viewing distances and also allows the two prisms to be folded together as shown in FIG. 14 to provide an aesthetically pleasing device. The hinge can be stiff, so that the unfolded viewer can be flexed back and forth by small amounts to provide an adjustable deviation of the lines of sight to handle different viewing distances. When not is use, this viewer can be folded up in the manner indicated in FIG. 14. This folding only works out if the prisms are fairly large—about 2"×2" for each face. Smaller prisms must still be separated by the interpupillary distance and do not have their apexes touching the way the FIG. 13 viewer does.

The optical quality of the prisms is perfect. There are no color effects or distortion present. This is because the light path through the prisms, with the reflections off the bases 48 and 54, is equivalent to looking through a tilted parallel plate of glass. The field of view that gets through the prisms is large because the angles inside the glass are reduced by a factor of the index of refraction. The reflection inside is a total internal reflection, so it is not necessary to aluminize or silver the bases 48 and 54. There are no ghost images of the type encountered in the embodiment of FIG. 10, and one cannot see between the prisms to have a direct view of the paintings. All the important angles are built right into the prisms and the only assembly required is attaching the hinge between them. The hinge also provides for an adjustable viewing distance. The price of the prisms is low since the angle tolerances are very loose and military surplus or reject quality is more than adequate.

The adjustability of the line of sight in my preferred viewers provides one additional surprising advantage. Normally one adjusts the angle so that the left eye views the left eye stereogram and vice versa. This provides normal depth perception. However, if the angle of the line of sight is adjusted so that the left eye views the right eye stereogram and vice versa, then inverse depth perception is provided; i.e. near objects appear far away and vice versa. This provides an interesting effect when viewing the surreal Dali art works.

Of the variety of viewers I have invented the foldable prism system seems to offer the most advantages. Furthermore, it is the only one where the optics themselves can be featured as an art object. The prism bases may be silvered and then can be decorated with designs or art that reflect the themes of the paintings being viewed.

It will thus be seen that the objects set forth above among those made apparent from the preceding description are efficiently attained and, since certain changes may be made in the above constructions and articles without departing from the scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which as a matter of language might be said to fall therebetween.

Having described my invention what I claim as new and desire to secure by Letters Patent is:

1. A binocular steroscopic viewer for deviating the line of sight of an observer such that the stereogram on the right is viewed by the left eye and the stereogram on the left is viewed by the right eye, comprising a pair of prisms mounted with their apices close together and pointed towards each other across the nose of the observer such that light enters through one face of each prism obliquely, is reflected obliquely off another face, passes through a third face obliquely and then is transmitted to the observer's eye.

2. A viewer according to claim 1 wherein said reflection is accomplished by total internal reflection.

3. A viewer as defined in claim 1 wherein the lines of sight of the viewer are reflected off mirrored surfaces.

4. A viewer according to claims 1, 2 or 3 wherein said prisms are hinged together at their apices.

5. A viewer as defined in claim 4 in which said prisms are identical and fold together along said hinge to form a closed prism.

6. A viewer as defined in claims 1, 2 or 3 wherein the apex angle of said prisms is 90°.

7. A viewer according to claim 4 wherein the apex angle of said prisms is 90°.

8. A viewer according to claim 5 wherein the apex angle of said prisms is 90°.

* * * * *